US012687983B2

(12) United States Patent
Noda et al.

(10) Patent No.: US 12,687,983 B2
(45) Date of Patent: Jul. 21, 2026

(54) DATA PROCESSING METHOD AND DATA PROCESSING PROGRAM

(71) Applicant: Fujitsu Limited, Kawasaki (JP)

(72) Inventors: Masahide Noda, Kawasaki (JP); Koichi Yokota, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 242 days.

(21) Appl. No.: 18/203,234

(22) Filed: May 30, 2023

(65) Prior Publication Data

US 2024/0069791 A1 Feb. 29, 2024

(30) Foreign Application Priority Data

Aug. 29, 2022 (JP) ................................. 2022-136107

(51) Int. Cl.
*G06F 3/06* (2006.01)
*G06F 16/27* (2019.01)

(52) U.S. Cl.
CPC ............ *G06F 3/0655* (2013.01); *G06F 3/061* (2013.01); *G06F 3/0679* (2013.01); *G06F 16/27* (2019.01)

(58) Field of Classification Search
CPC ........ G06F 3/061; G06F 3/067; G06F 3/0604; G06F 3/0608; G06F 3/0631; G06F 3/0655; G06F 3/0659; G06F 3/0679; G06F 16/27
USPC ........................................................ 707/770
See application file for complete search history.

(56) References Cited

U.S. PATENT DOCUMENTS 9,143,563 B2 9/2015 Pingel et al.
2016/0173475 A1 6/2016 Srinivasan et al.

2019/0138333 A1 5/2019 Deutsch et al.
2019/0354922 A1* 11/2019 Berti .................... G06K 7/1417
2020/0295942 A1* 9/2020 Bartolucci ........... G06Q 10/067
2021/0117593 A1 4/2021 Essl et al.
2021/0405629 A1* 12/2021 Malakuti .......... G05B 19/41885
2022/0188440 A1* 6/2022 DeLuca ................. G06F 30/10

(Continued)

FOREIGN PATENT DOCUMENTS

CN 115034030 A * 9/2022
JP 2017-199250 A 11/2017

(Continued)

OTHER PUBLICATIONS

Extended European Search Report dated Nov. 9, 2023, issued in counterpart application No. 23176939.9. (14 pages).

(Continued)

*Primary Examiner* — Tony Mahmoudi
*Assistant Examiner* — Kamal K Dewan
(74) *Attorney, Agent, or Firm* — WHDA, LLP

(57) ABSTRACT

A computer of a data processing device comprising: a common digital twin in which first processed data obtained by processing received source data is stored; a specific digital twin in which second processed data obtained by processing the source data is stored; and a service processor for each of a plurality of services that requests access to the common digital twin or the specific digital twin to perform data processing. Each of a plurality of the service processors is configured to: read the second processed data from the specific digital twin for each of the plurality of services; and when no data to be read is determined to exist, read the first processed data from the common digital twin, in accordance with a predetermined data distribution rule.

9 Claims, 13 Drawing Sheets

(56) References Cited

U.S. PATENT DOCUMENTS

| | | | | |
|---|---|---|---|---|
| 2022/0253321 A1* | 8/2022 | Iida | .......................... | G06F 9/453 |
| 2023/0315073 A1* | 10/2023 | Brikis | .............. | G05B 19/41885 |
| | | | | 703/13 |
| 2023/0396650 A1* | 12/2023 | Bleibtrey | ................ | H04L 63/10 |
| 2024/0054355 A1* | 2/2024 | Olling | .................... | G06F 16/25 |
| 2024/0061975 A1* | 2/2024 | Harvey | ................... | G06T 11/60 |
| 2024/0411958 A1* | 12/2024 | Roemerman | .......... | G06N 20/20 |
| 2025/0005043 A1* | 1/2025 | Moosa | ................... | G06Q 10/04 |

FOREIGN PATENT DOCUMENTS

| | | | | |
|---|---|---|---|---|
| WO | 2017/090142 A1 | 6/2017 | | |
| WO | WO-2023194858 A1 * | 10/2023 | .............. | G08G 5/32 |

OTHER PUBLICATIONS

Office Action dated Jun. 12, 2025, issued in counterpart EP Application No. 23176939.9. (15 pages).

* cited by examiner

SAME INFORMATION IS DOUBLY
COLLECTED AND RETAINED TO
INCUR HIGH COST

COLLISION OF ASSOCIATED INFORMATION
(ATTRIBUTE NAME, RELATIONSHIP),
CONFIDENTIALITY ASSURANCE, ETC.

| REQUEST SOURCE | READ | WRITE |
|---|---|---|
| SENSOR | NONE | COMMON DT |
| SERVICE UNIT #1 | SPECIFIC DT #1 → COMMON DT | SPECIFIC DT #1 |
| SERVICE UNIT #2 | SPECIFIC DT #2 → COMMON DT | SPECIFIC DT #2 |
| COMMON | COMMON DT | COMMON DT |

| SERVICE | DT |
|---|---|
| SERVICE UNIT #1 | SPECIFIC DT #1 |
| SERVICE UNIT #2 | SPECIFIC DT #2 |

Figure 5:
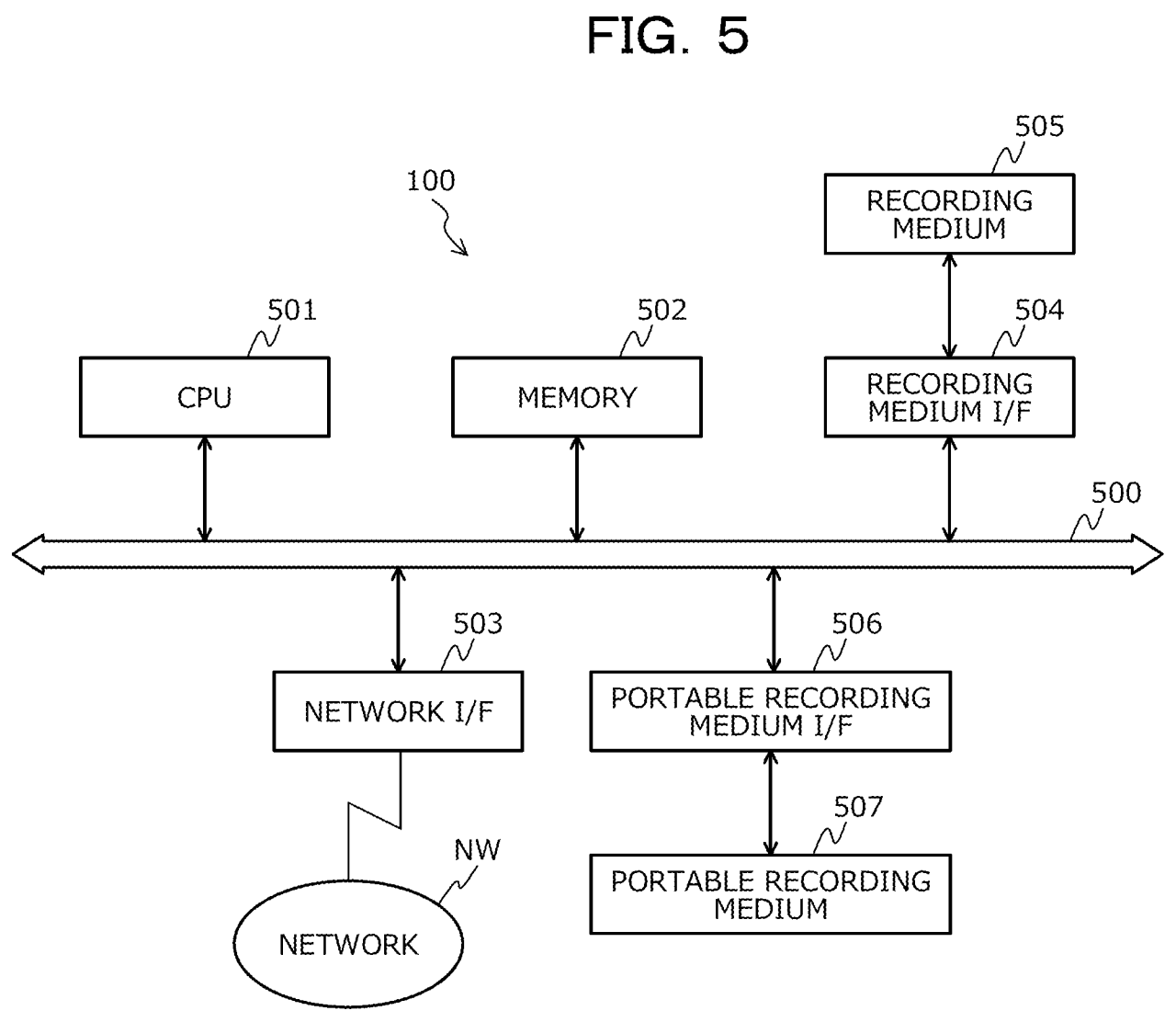

501 CPU

502 MEMORY

503 NETWORK I/F

NW NETWORK

505 RECORDING MEDIUM

504 RECORDING MEDIUM I/F

506 PORTABLE RECORDING MEDIUM I/F

507 PORTABLE RECORDING MEDIUM

500

DATA PROCESSING METHOD AND DATA PROCESSING PROGRAM

CROSS-REFERENCE TO RELATED APPLICATION

This application is based upon and claims the benefit of priority of the prior Japanese Patent Application No. 2022-136107, filed on Aug. 29, 2022, the entire contents of which are incorporated herein by reference.

FIELD

The embodiment discussed herein is related to a data processing method and a data processing program.

BACKGROUND

An object actually operating in the real world may be represented as a model of mapping in a virtual space according to a digital twin (DT). For example, source data of a state such as a sensor value detected by a real-world IoT device is transmitted to a center. The center constructs a digital twin of the real-world object from the received source data. In the center, the digital twin for each service performs a process of visualizing and analyzing the real world using the source data. When the center carries out the analysis and visualization, information derived based on the target source data is stored in association with the object (twin), which makes it easier to perform analysis and visualization processing (referred to as specific processing).

As related art, for example, there is a technique for a multi-tenant service in which a database has common data and specific data for each tenant and an specific schema is enabled to access the common data through a view. Furthermore, for example, there is a technique in which a plurality of computers for data analysis is provided and the computers for data analysis are distributed and executed for each analysis process. Furthermore, for example, there is a technique of simulating a plurality of aspects of a system by defining each model-specific data and common data in a plurality of simulation environments. Furthermore, for example, there is a technique of defining specific and common regions and separating domains using a function of multi-tenant identity management (IDM) in a cloud environment.

International Publication Pamphlet No. WO 2017/090142, Japanese Laid-open Patent Publication No. 2017-199250, U.S. Patent Application Publication No. 2021/0117593, and U.S. Patent Application Publication No. 2016/0173475 are disclosed as related art.

SUMMARY

According to an aspect of the embodiments, a method for data processing to be performed by a computer of a data processing device including: a common digital twin in which first processed data obtained by processing received source data is stored; a specific digital twin in which second processed data obtained by processing the source data is stored; and a service processor for each of a plurality of services that requests access to the common digital twin or the specific digital twin to perform data processing, wherein each of a plurality of the service processors is configured to: read the second processed data from the specific digital twin for each of the plurality of services; and when no data to be read is determined to exist, read the first processed data from the common digital twin, in accordance with a predetermined data distribution rule.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an exemplary hardware configuration of the data processing device;

DESCRIPTION OF EMBODIMENTS

Since the real world is vast, a huge storage area is needed for mapping of the real world. Accordingly, enormous cost is to be involved if a digital twin is prepared for each service. On the other hand, if a digital twin is shared by a plurality of services, there is a problem that specific processing results, which are service-specific, cause collision at the time of saving (writing) the specific processing results of specific services in the digital twin. For example, for the same attribute "average speed" calculated by each of the specific services, a collision occurs in which the specific processing results having values different for each service are to be written. In the related art, there has been a problem that efficient storage use may not be available when the number of services increases.

In one aspect, an object of the embodiment is to enable efficient use of storage even when the number of services increases.

According to one aspect of the embodiment, an effect that storage may be efficiently used even when the number of services increases is exerted.

Hereinafter, an embodiment of a data processing method and a data processing program according to the disclosure will be described in detail with reference to the drawings. (Example of Data Processing Method According to Embodiment)

Figure 1:
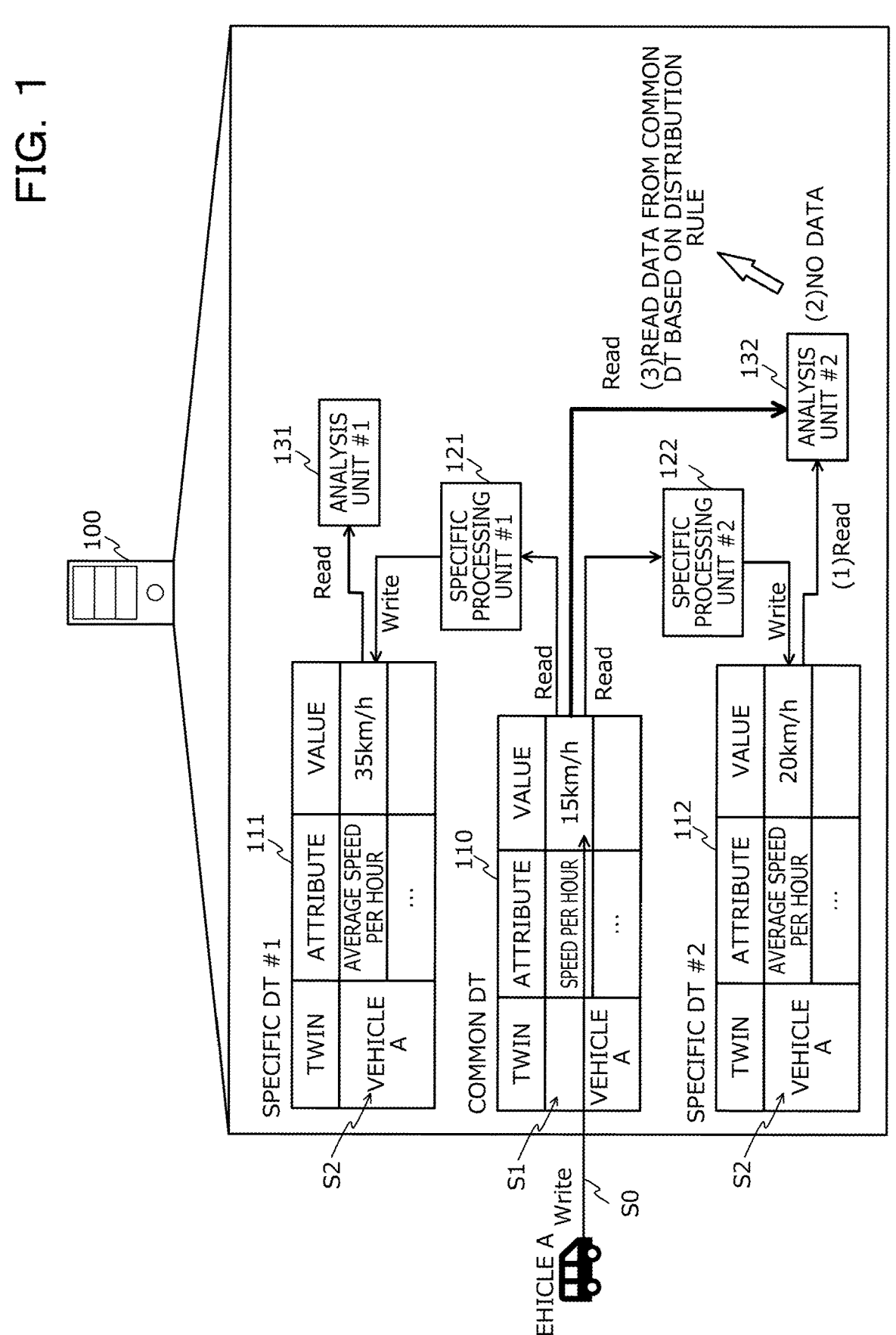
FIG. 1 is an explanatory diagram illustrating an example of a data processing method according to an embodiment.

FIG. 1 is an explanatory diagram illustrating an example of a data processing method according to an embodiment. A data processing device 100 includes, for example, a common digital twin (DT) common to a plurality of services, and a specific digital twin unique to each of the plurality of services. The data processing device 100 is a computer that performs a process of distributing reading and writing of data for the common DT and the specific DT based on a distribution rule at a time of a data request (input/output (I/O) request). The common DT and the specific DT are each formed in a storage area such as a database (DB).

Exemplary data processing of the data processing device 100 will be described with reference to the example illustrated in FIG. 1. In this example, a vehicle A transmits a speed to the data processing device 100, and an average speed per hour is calculated for each of the plurality of services to carry out analysis processing based on the average speed per hour.

The data processing device 100 writes, for example, first processed data S1 obtained by processing information regarding the "speed", which is source data S0 transmitted from a sensor of the vehicle A, in a common DT 110 (Write). The data processing device 100 writes, in the common DT 110, a twin name "vehicle A", an attribute "speed per hour", and a speed value "15 km/h" as the first processed data S1.

In the example of FIG. 1, a specific DT #1 (111) and a specific DT #2 (112) are provided as two specific DTs corresponding to two different services related to the twin "vehicle A". Furthermore, an specific processing unit #1 (121) and an specific processing unit #2 (122) are provided corresponding to the two services. Furthermore, an analysis unit #1 (131) and an analysis unit #2 (132) are provided corresponding to the two services.

The specific processing unit #1 (121) reads the value of the speed per hour, which is the first processed data S1 of the vehicle A, from the common DT 110, and performs specific processing of generating second processed data S2 corresponding to a service #1 on the read value. Then, the specific processing unit #1 (121) writes the second processed data S2, which is the specific processing result, in the specific DT #1 (111) (Write). The specific processing unit #1 (121) calculates, from the common DT 110, an average value (average speed) of the "speed per hour" of a predetermined period of time (e.g., during the past 10 minutes) for the value of the "speed per hour", which is data of the vehicle A.

In the example of FIG. 1, the specific processing unit #1 (121) calculates an average speed "35 km/h" as the second processed data S2, and writes the twin name "vehicle A", the attribute "average speed per hour", and the speed value "35 km/h" in the specific DT #1 (111).

The analysis unit #1 (131) carries out the analysis processing corresponding to the service #1. For example, the analysis unit #1 (131) reads the average speed per hour of the vehicle A, which is the second processed data S2, from the specific DT #1 (111) (Read), and carries out the analysis processing for the service #1, such as prediction of traveling of the vehicle A, based on the average speed per hour and values of other attributes.

The specific processing unit #2 (122) reads the value of the speed per hour, which is the first processed data S1 of the vehicle A, from the common DT 110, and performs specific processing of generating second processed data S2 corresponding to a service #2 on the read value. Then, the specific processing unit #2 (122) writes the second processed data S2, which is the specific processing result, in the specific DT #2 (112) (Write). The specific processing unit #2 (122) calculates, from the common DT 110, an average value (average speed) of the "speed per hour" of a predetermined period of time (e.g., during the past 30 minutes) for the value of the "speed per hour", which is data of the vehicle A.

In the example of FIG. 1, the specific processing unit #2 (122) calculates an average speed "20 km/h" as the second processed data S2, and writes the twin name "vehicle A", the attribute "average speed per hour", and the speed value "20 km/h" in the specific DT #2 (112).

The analysis unit #2 (132) carries out the analysis processing corresponding to the service #2. For example, the analysis unit #2 (132) reads the average speed per hour of the vehicle A, which is the second processed data S2, from the specific DT #2 (112) (Read), and carries out the analysis processing for the service #2, such as prediction of traveling of the vehicle A, based on the average speed per hour and values of other attributes.

For example, the specific DT #1 (111) and the specific DT #2 (112) are managed by different service providers, and the common DT 110 is managed by a service base provider.

Here, for example, some specific DTs do not include an specific processing unit. In that case, the second processed data S2 (specific processing result) processed by the specific processing unit does not exist in the specific DT but exists only in the common DT. In this case, the DT from which the analysis unit obtains the processed data (specific processing result) differs for each specific DT.

In the embodiment, the data processing device 100 has a distribution rule for each access request source with respect to the DT. A basic default distribution rule is "reading the second processed data S2 and reading the first processed data S1 if it is determined that no data to be read exists". The data processing device 100 controls the reading of the DT based on the distribution rule setting. This makes it possible to control a source from which data is obtained with a simple mechanism.

The distribution rule may be set for each access request source with respect to the DT. For example, in a case where the access request source has a distribution rule and the data processing device 100 has succeeded in obtaining the distribution rule from the request source, distribution may be carried out in accordance with the obtained distribution rule instead of the default acquisition rule.

Note that the default distribution rule described above may also be rephrased as "reading the attribute value of the common DT until the specific processing of the service is written, and reading the attribute of the specific DT when the specific processing is written".

As a result, the data processing device 100 is enabled to present one DT for the plurality of services while having the common DT and the specific DT, which makes it possible to reduce resources and the like.

A specific example will be described as follows:

(1) It is assumed that the analysis unit #2 (132) reads the second processed data S2 (specific processing result) from the specific DT #2 (112) as illustrated in FIG. 1. (2) However, it is assumed that no second processed data S2 (specific processing result) exists in the specific DT #2 (112). In this case, (3) The analysis unit #2 (132) reads data (first processed data S1) from the common DT 110 based on the distribution rule.

Here, the analysis unit #2 (132) may also read the first processed data S1 "speed per hour" from the common DT 110 and carry out the analysis processing corresponding to the service #2. Although not exemplified in FIG. 1, it is assumed that the vehicle A transmits the "speed per hour" and "average speed per hour" to write them in the common DT 110. Then, it is assumed that no data of the attribute "average speed per hour" exists in the specific DT #2 (112). In this case, the analysis unit #2 (132) may read the same attribute "average speed per hour" from the common DT 110 to carry out the analysis processing based on the distribution rule (3).

Here, according to the processing of (3) the analysis unit #2 (132) reads data (first processed data S1) from the common DT 110 based on the distribution rule, it becomes possible to support different service forms. For example, there are the following service forms [1.] to [3.].

[1.] Sharing a DT among multiple different services. [2.] Reducing a change cost at a time of changing calculation of an attribute value depending on a situation. [3.] Reducing a change cost when it is desired to change a reading destination of a DT depending on a situation. Exemplary processes of the services according to those respective forms [1.] to [3.] will be described later as exemplary processes [1.] to [3.].

(Problems of Existing DT)

Here, problems of an existing DT will be described with reference to FIGS. 2 to 3B. Since the real world is vast, a huge storage area is needed for mapping of the real world.

Figure 2:
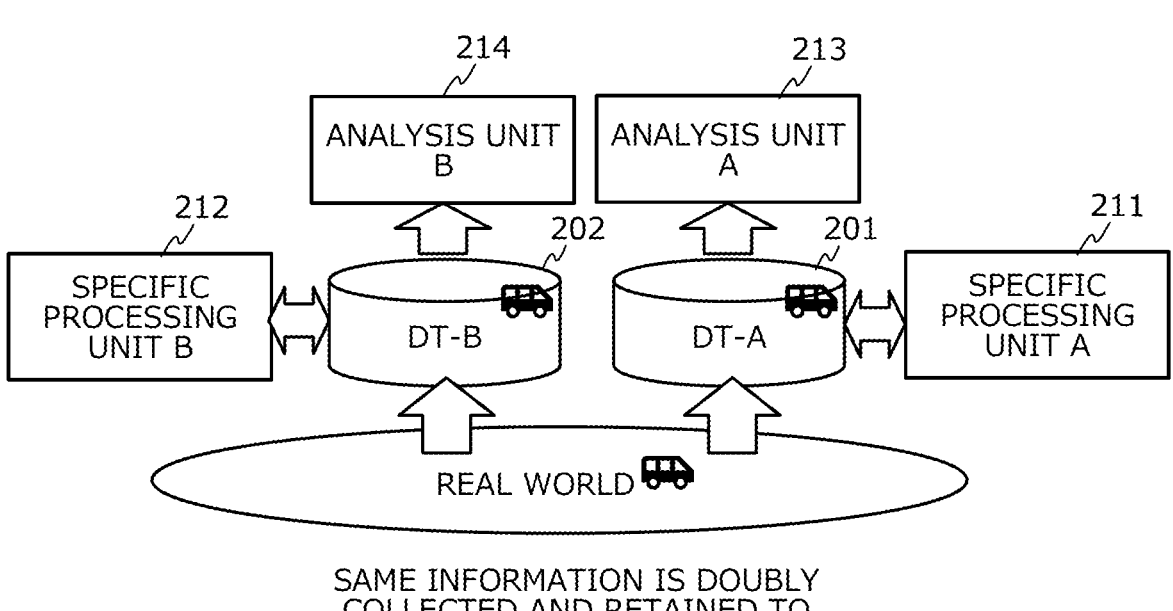
FIG. 2 is an explanatory diagram of a problem when a digital twin is prepared for each service.

FIG. 2 is an explanatory diagram of a problem when a digital twin is prepared for each service. For example, a DT-A (201) and a DT-B (202) need to be prepared corresponding to two services A and B. Furthermore, an specific processing unit A (211), an specific processing unit B (212), an analysis unit A (213), and an analysis unit B (214) are prepared corresponding to the two services. In the exemplary configuration of FIG. 2, the same information is doubly collected and retained by the two services so that the DT-A (201) and the DT-B (202) are needed, which incurs enormous cost.

Figure 3A:
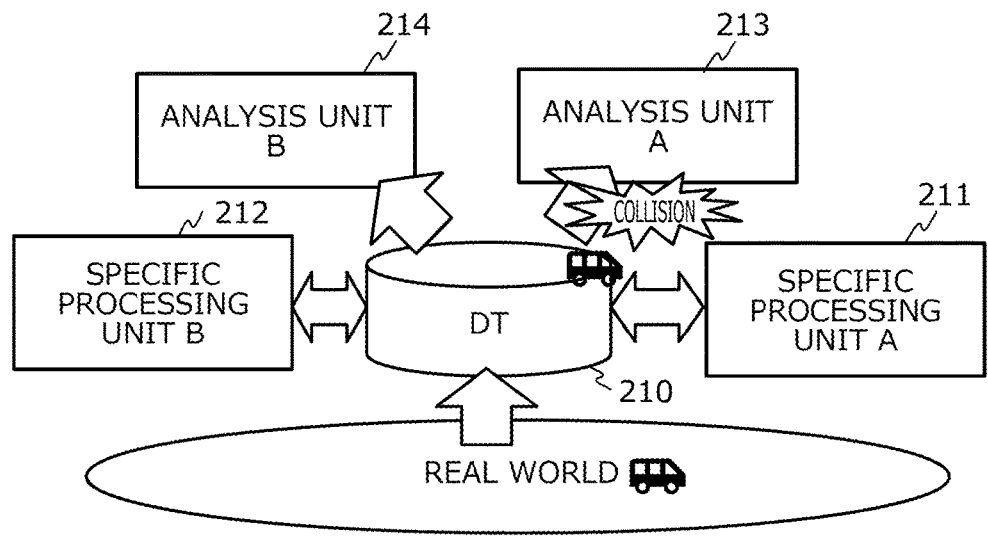
FIGS. 3A and 3B are explanatory diagrams of a problem when a digital twin is shared by a plurality of services.
Figure 3B:
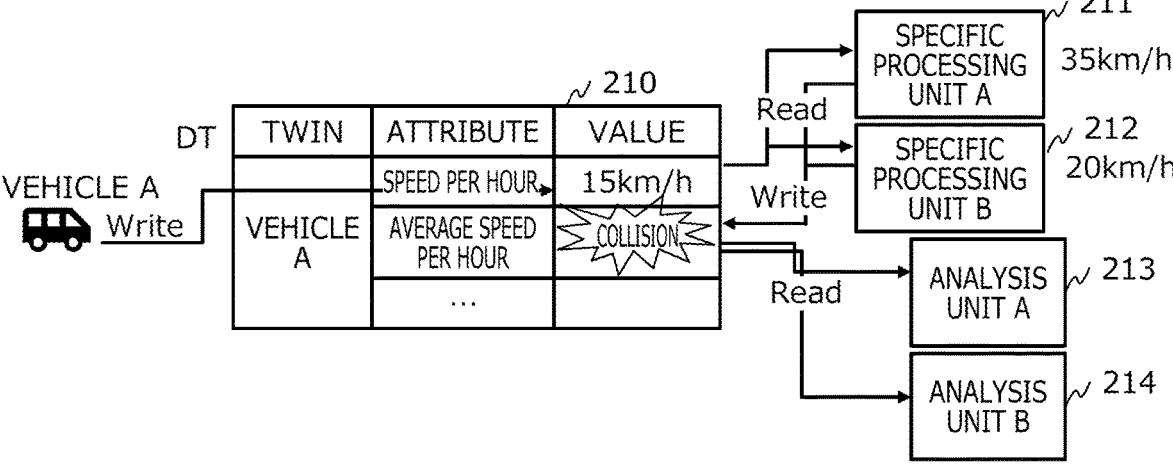

FIGS. 3A and 3B are explanatory diagrams of a problem when a digital twin is shared by a plurality of services. As illustrated in FIG. 3A, a DT 210 common to the two services A and B is prepared. Furthermore, an specific processing unit A (211), an specific processing unit B (212), an analysis unit A (213), and an analysis unit B (214) are prepared corresponding to the two services. When a digital twin is shared by a plurality of services, there is a problem that specific processing results, which are service-specific, cause collision at the time of saving (writing) the specific processing results of specific services in the digital twin.

For example, for a certain attribute "speed per hour" common to the specific services, a collision occurs in which the specific processing results having values different for each service are to be written. As described above, when the digital twin is shared by a plurality of services, not only a collision occurs in information associated with the plurality of services, such as attributes and relationships, but also a problem of confidentiality occurs.

FIG. 3B illustrates a specific example of collision occurrence. For example, it is assumed that the specific processing unit A (211) calculates the attribute "average speed per hour (35 km/h)" for the past 10 minutes based on the "speed per hour" of the vehicle A, and writes it in the DT 210. Furthermore, it is assumed that the specific processing unit B (212) calculates the attribute "average speed per hour (20 km/h)" for the past 30 minutes based on the "speed per hour" of the vehicle A, and writes it in the DT 210. In this case, a collision occurs as the specific processing unit A (211) and the specific processing unit B (212) attempt to write different values (35 km/h and 20 km/h) for the same attribute "average speed per hour" in the DT 210, whereby analysis may not be carried out.

While an exemplary attribute collision has been described with reference to FIG. 3B, there is a relationship collision as another exemplary collision. As for the relationship collision, a collision occurs when a similar relationship name is used in a relationship between digital twins (e.g., hierarchical relationship between a person and an organization, etc.). Furthermore, a problem of confidentiality is raised. For example, in a case where the analysis unit A (213) and the analysis unit B (214) are services of different companies, specific processing results may not be intended to be disclosed to each other, but this may not be adapted, whereby the confidentiality may not be maintained.

(Functions of Data Processing Device of Embodiment)

Figure 4:
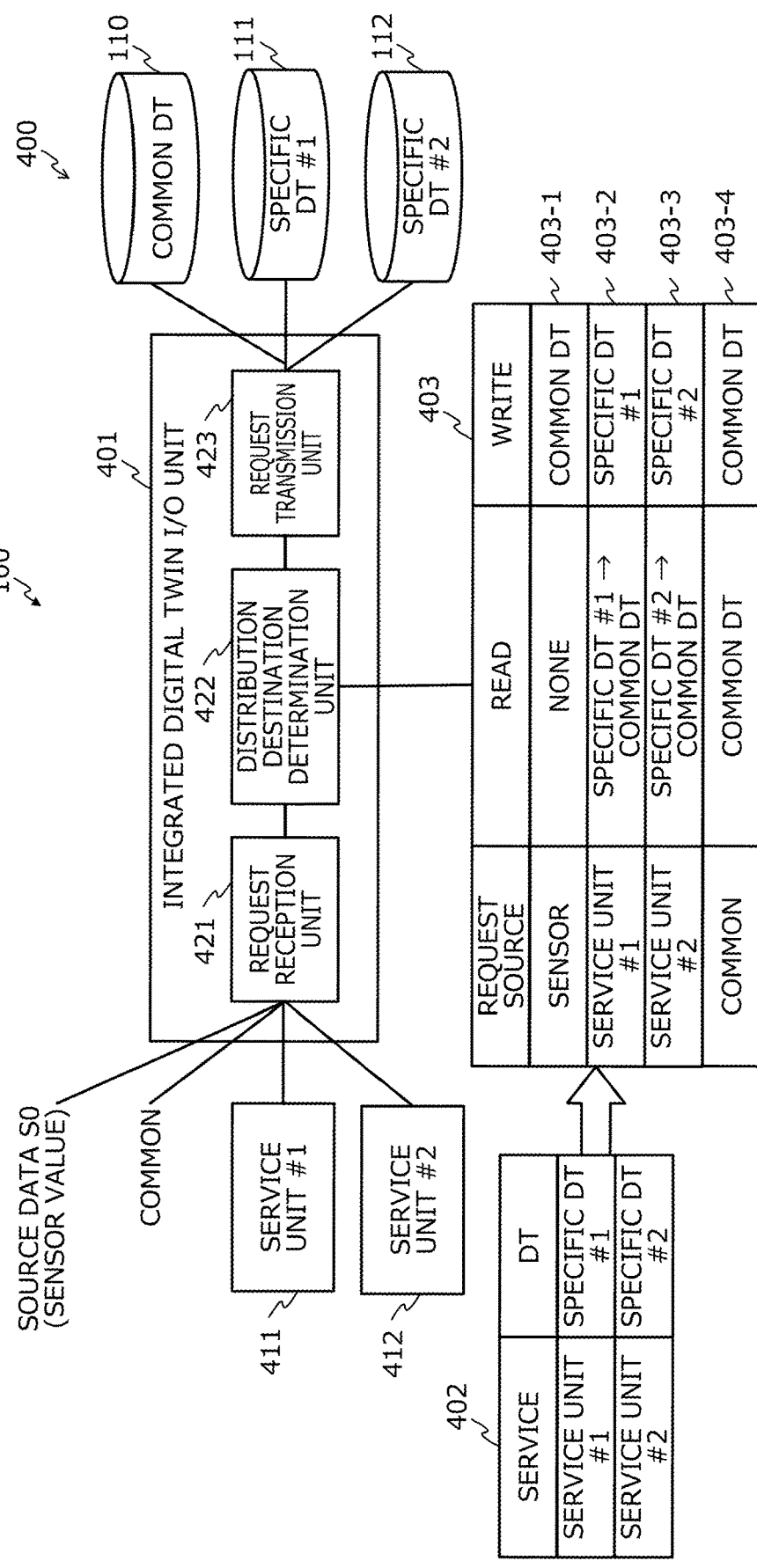
FIG. 4 is an explanatory diagram of functions of a data processing device according to the embodiment.

FIG. 4 is an explanatory diagram of functions of the data processing device according to the embodiment. The data processing device 100 is configured by distributed processing of a plurality of servers, for example. The data processing device 100 includes an integrated digital twin I/O unit 401, a service DT setting table 402, a distribution rule table 403, the common DT 110, the specific DT #1 (111), the specific DT #2 (112), a service unit #1 (411), and a service unit #2 (412). The service units (411, 412) may be processors such as servers.

The common DT 110, the specific DT #1 (111), and the specific DT #2 (112) are an integrated digital twin 400 integrated into one. Furthermore, it is assumed that the data processing device 100 receives a value of the "speed" detected by the sensor of the vehicle A illustrated in FIG. 1 as source data S0.

Although the number of the specific digital twins is set to two, which includes the specific DT #1 (111) and the specific DT #2 (112) corresponding to the two services, in the exemplary configuration of FIG. 4 for the sake of convenience, the number of the specific digital twins may be arranged depending on the number of services. The service unit #1 (411) and the service unit #2 (412) include the specific processing unit and the analysis unit illustrated in FIG. 1.

Information regarding the DT to be accessed for each service is set in the service DT setting table 402. For example, information indicating that the access of the service unit #1 (411) is the specific DT #1 (111) and the access of the service unit #2 (412) is the specific DT #2 (112) is set. Note that the common DT 110 is accessible from both of the service unit #1 (411) and the service unit #2 (412).

For example, the service unit #1 (411) includes the specific processing unit #1 (121) and the analysis unit #1 (131) illustrated in FIG. 1. The service unit #1 (411) accesses (reads and writes) the common DT 110 and the specific DT #1 (111) via the integrated digital twin I/O unit 401.

The service unit #2 (412) includes the specific processing unit #2 (122) and the analysis unit #2 (132) illustrated in FIG. 1. The service unit #2 (412) accesses the common DT 110 and the specific DT #2 (112) via the integrated digital twin I/O unit 401.

The integrated digital twin I/O unit 401 includes a request reception unit 421, a distribution destination determination unit 422, and a request transmission unit 423. The request reception unit 421 receives a request for accessing the digital twin. In the example of FIG. 4, the request reception unit 421 receives requests from the source data S0 of "speed" transmitted by the "vehicle A", the service unit #1 (411), and the service unit #2 (412).

The distribution destination determination unit 422 refers to the distribution rule table 403 based on the request from the transmission source of the source data S0 that has made the request or the service units #1 and #2 (411 and 412).

Then, the distribution destination determination unit 422 determines distribution destinations of access (reading and writing) to the DT (common DT 110 and specific DTs #1 and #2 (111 and 112)) based on the distribution rule set in the distribution rule table 403.

In the distribution rule table 403, information regarding a request source, a distribution rule of reading from the DT, and a distribution rule of writing to the DT is set. In response to write requests from the specific processing unit and the analysis unit, the distribution destination determination unit 422 performs writing in the corresponding specific DT in accordance with the distribution rule, for example. Furthermore, in response to read requests from the specific processing unit and the analysis unit, the distribution destination determination unit 422 first performs reading from the service-specific DT, and then performs reading from the common DT if there is no data. In addition, in a case where no specific distribution rule is defined by the request source, the distribution destination determination unit 422 performs processing by applying a default distribution rule.

In the distribution rule table 403 of the example illustrated in FIG. 4, "reading the attribute value of the common DT until the specific processing of the service is written, and reading the attribute of the specific DT when the specific processing is written" is set as the default distribution rule. In a record 403-1 of the distribution rule table 403, only writing to the common DT 110 is set for the source data S0 from the sensor.

Furthermore, in the example of FIG. 4, "specific DT #1→common DT" is set for reading from the DT in the service unit #1 (411) in a record 403-2 of the distribution rule table 403. This indicates that the data of the attribute requested from the specific DT #1 (111) is first read, and the data is read from the common DT 110 if it fails to read the data from the specific DT #1 (111) (including a case where there is no value). For example, in the example of FIG. 1, the analysis unit #1 (131) of the service unit #1 (411) first reads the data of the attribute requested from the specific DT #1 (111), and reads the data from the common DT 110 if it fails to read the data of the attribute from the specific DT #1 (111).

Furthermore, in the example of FIG. 4, "specific DT #1" is set for writing to the DT in the service unit #1 (411) in the record 403-2 of the distribution rule table 403. This indicates that the data of the attribute requested is written only in the specific DT #1 (111).

Furthermore, in the example of FIG. 4, "specific DT #2→common DT" is set for reading from the DT in the service unit #2 (412) in a record 403-3 of the distribution rule table 403. This indicates that the data of the attribute requested from the specific DT #2 (112) is first read, and the data is read from the common DT 110 if it fails to read the data from the specific DT #2 (112) (including a case where there is no value). For example, in the example of FIG. 1, the analysis unit #2 (132) of the service unit #2 (412) first reads the data of the attribute requested from the specific DT #2 (112), and reads the data from the common DT 110 if it fails to read the data of the attribute from the specific DT #2 (112).

Furthermore, in the example of FIG. 4, "specific DT #2" is set for writing to the DT in the service unit #2 (412) in the record 403-3 of the distribution rule table 403. This indicates that the data of the attribute requested is written only in the specific DT #2 (112).

Furthermore, in the example of FIG. 4, reading and writing from and to the common DT 110 are set for a "common" request that does not specify a request source in a record 403-4 of the distribution rule table 403.

(Exemplary Hardware Configuration of Data Processing Device)

FIG. 5 is a diagram illustrating an exemplary hardware configuration of the data processing device. The data processing device 100 may be configured by a computer such as a server including general-purpose hardware illustrated in FIG. 5.

The data processing device 100 includes a central processing unit (CPU) 501, a memory 502, and a network interface (I/F) 503. Furthermore, the data processing device 100 includes a recording medium I/F 504, a recording medium 505, a portable recording medium I/F 506, and a portable recording medium 507. Furthermore, the specific components are coupled to each other by a bus 500.

The CPU 501 functions as a control unit that takes overall control of the data processing device 100. The CPU 501 may include a plurality of cores. The memory 502 includes, for example, a read only memory (ROM), a random-access memory (RAM), a flash ROM, and the like. Specifically, the flash ROM stores an operating system (OS) program, the ROM stores application programs, and the RAM is used as a work area for the CPU 501, for example. A program stored in the memory 502 is loaded into the CPU 501 to cause the CPU 501 to execute coded processing.

The network I/F 503 is coupled to a network NW through a communication line, and is coupled to an external computer through the network NW. In a case where the data processing device 100 includes a plurality of servers, for example, each server is coupled to the external computer through the network NW. Then, the network I/F 503 manages an interface between the network NW and the inside of the device, and controls input and output of data from the external computer. For example, a modem, a local area network (LAN) adapter, or the like may be adopted as the network I/F 503.

The recording medium I/F 504 controls reading and writing of data from and to the recording medium 505 under the control of the CPU 501. The recording medium 505 stores data written under the control of the recording medium I/F 504. Examples of the recording medium 505 include a magnetic disk, an optical disc, and the like.

The portable recording medium I/F 506 controls reading and writing of data from and into the portable recording medium 507 under the control of the CPU 501. The portable recording medium 507 stores data written under the control of the portable recording medium I/F 506. Examples of the portable recording medium 507 include a compact disc (CD)-ROM, a digital versatile disk (DVD), a universal serial bus (USB) memory, and the like.

Note that the data processing device 100 may include, for example, an input device, a display, and the like in addition to the components described above.

The functions of the integrated digital twin I/O unit 401 illustrated in FIG. 4 may be implemented by the CPU 501 illustrated in FIG. 5 executing a program. The functions of the service DT setting table 402, the distribution rule table 403, the common DT 110, the specific DT #1 (111), and the specific DT #2 (112) illustrated in FIG. 4 may be implemented by, for example, using the recording medium 505 and the portable recording medium 507 illustrated in FIG. 5.

Meanwhile, the service units #1 and #2 (411 and 412) illustrated in FIG. 4 may be configured by hardware such as the server in FIG. 5 and the like each owned by a service company outside the data processing device 100.

(Exemplary Process of Data Processing Device)

Next, each exemplary process of the data processing device 100 will be described. Each of the following processes is performed by the CPU 501, which serves as a control unit of the data processing device 100.

(First Exemplary Process of Data Processing Device)

Figure 6A:
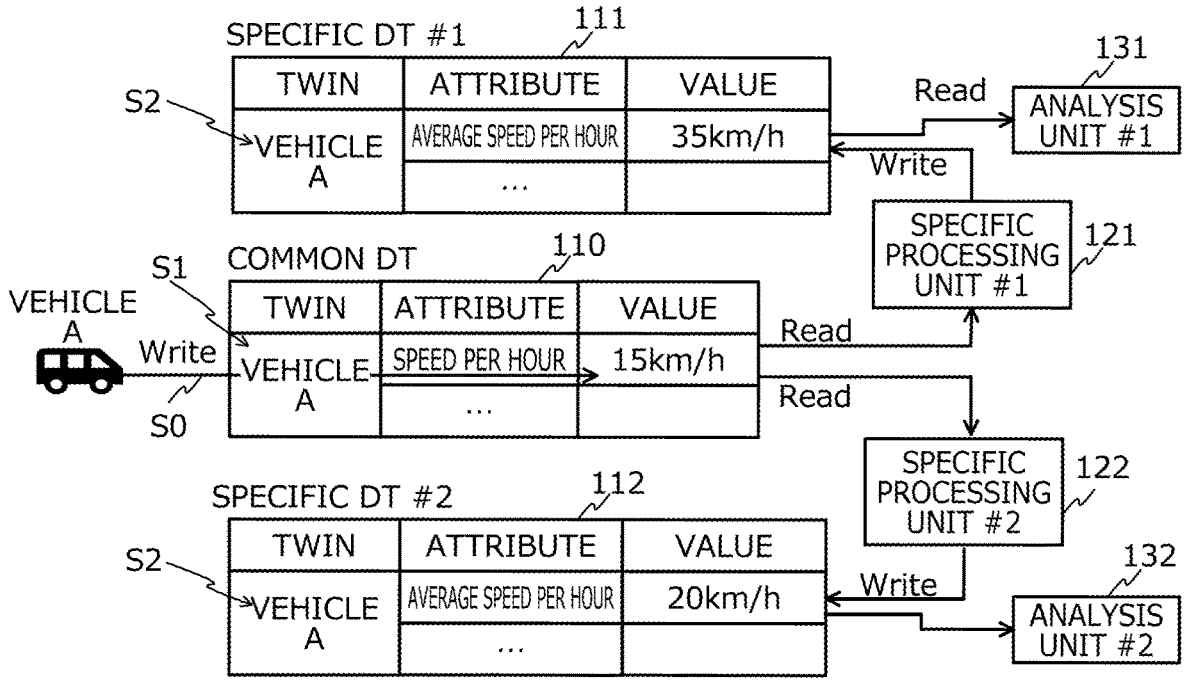
FIGS. 6A and 6B are explanatory diagrams of a first exemplary process performed by the data processing device.
Figure 6B:
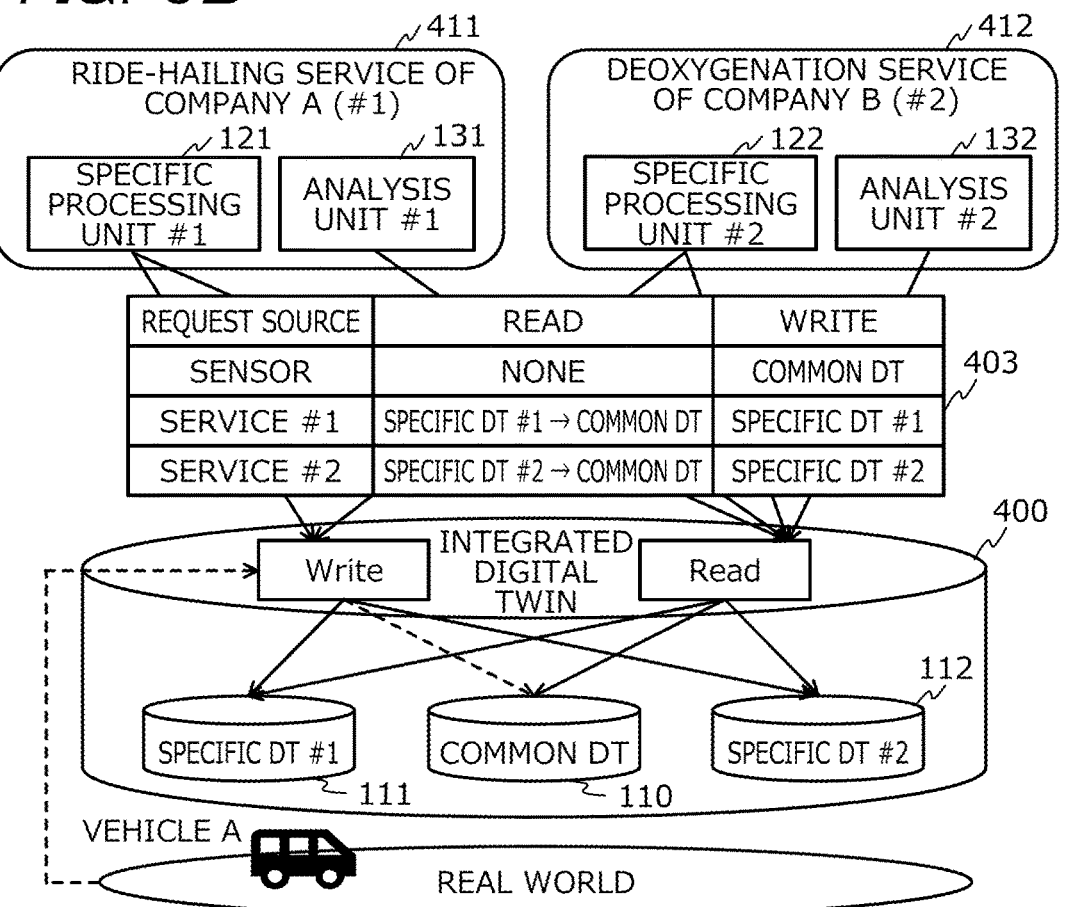

FIGS. 6A and 6B are explanatory diagrams of a first exemplary process performed by the data processing device. FIGS. 6A and 6B illustrate an exemplary process in the case of above-described [1.] sharing a DT among multiple different services. FIG. 6A illustrates an access state of reading and writing to the DT in a similar manner to FIG. 1, and FIG. 6B illustrates a distribution state of reading and writing in response to a request for each service.

The distribution rule table 403 illustrated in FIG. 6B represents a default distribution rule, which is "reading the attribute value of the common DT until the specific processing of the service is written, and reading the attribute of the specific DT when the specific processing is written". Specifically, in the distribution rule table 403, only writing to the common DT 110 is set for the source data S0 from the sensor. Furthermore, "specific DT #1→common DT" is set for reading from the DT in the service unit #1 (411). Furthermore, "specific DT #1" is set for writing to the DT in the service unit #1 (411).

Furthermore, "specific DT #2→common DT" is set for reading from the DT in the service unit #2 (412). Furthermore, "specific DT #2" is set for writing to the DT in the service unit #2 (412).

The examples illustrated in FIGS. 6A and 6B are two exemplary services, and one is a ride-hailing service (#1) 411 of a company A, and the other one is a deoxygenation service (#2) 412 of a company B.

In the ride-hailing service (#1) 411 of the company A, the specific processing unit #1 (121) calculates the attribute "average speed per hour" for the past 10 minutes from the "speed per hour" to provide a service related to dispatch of the vehicle A. Then, the specific processing unit #1 (121) writes the calculated value in the specific DT #1 (111) based on the distribution rule of the distribution rule table 403.

Furthermore, the analysis unit #1 (131) performs reading based on the distribution rule of the distribution rule table 403. First, the analysis unit #1 (131) reads the value of the attribute "average speed" from the specific DT #1 (111). At this time, in a case where the analysis unit #1 (131) fails to read the value of the attribute "average speed" from the specific DT #1 (111), it reads the value of the "speed per hour" from the common DT 110, and carries out analysis based on the "speed per hour".

Furthermore, in the deoxygenation service (#2) 412 of the company B, the specific processing unit #2 (122) calculates the "average speed per hour" for the past 30 minutes from the "speed per hour" to predict a CO2 emission amount. Then, the specific processing unit #2 (122) writes the calculated value in the specific DT #2 (112) based on the distribution rule of the distribution rule table 403.

Furthermore, the analysis unit #2 (132) performs reading based on the distribution rule of the distribution rule table 403. First, the analysis unit #2 (132) reads the value of the attribute "average speed" from the specific DT #2 (112). At this time, in a case where the analysis unit #2 (132) fails to read the value of the attribute "average speed" from the specific DT #2 (112), it reads the value of the "speed per hour" from the common DT 110, and carries out analysis based on the "speed per hour".

As described above, the data processing device 100 is enabled to be present in a form of behaving as one DT in response to requests from different services, and is enabled to provide a plurality of services with one DT. Additionally, the common DT 110 and the service-specific DTs #1 and #2 (111 and 112) may be selectively used, and the storage area needed for the DT may be reduced.

Furthermore, since the mapping shared by the plurality of services only needs to be one common DT 110, a plurality of upload destinations of the source data S0 for creating the mapping does not need to be provided, and resources for the mapping may be reduced. For example, for the two services, the vehicle A only needs to transmit data to one common DT 110.

Furthermore, since analysis results among the plurality of services may be viewed as one DT, it becomes possible to know a relationship that has not been recognized previously. For example, by making a proposal to change the private vehicle A to a share-ride bus or the like based on the analysis results of the two services illustrated in FIGS. 6A and 6B, it becomes possible to present information regarding further reduction of CO2 emission.

(Storage Reduction Effect)

Figure 7A:
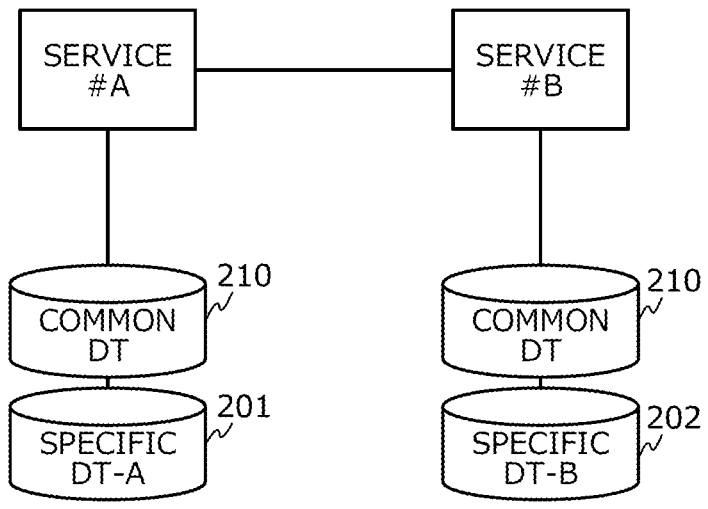
FIGS. 7A and 7B are comparative diagrams for explaining storage reduction.
Figure 7B:
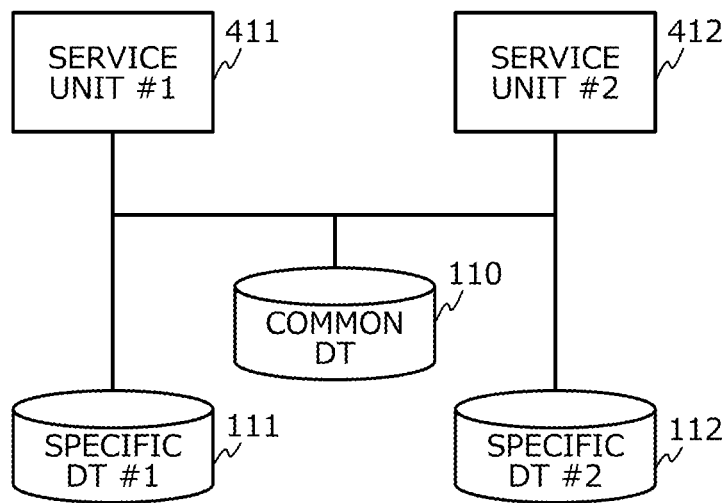

FIGS. 7A and 7B are comparative diagrams for explaining storage reduction. FIG. 7A illustrates an exemplary DT configuration according to the related art. According to the related art, a DT needs to be prepared for each service. As illustrated in FIG. 7A, in the case of the two services A and B, a common DT 210 and a specific DT-A 201 are prepared for the service A. Furthermore, the common DT 210 and a specific DT-B 202 also need to be prepared for the service B. In this manner, according to the related art, a storage area equivalent to the common DT 210 needs to be prepared for each service, which incurs enormous cost of the DT storage capacity as the number of services increases.

FIG. 7B illustrates an exemplary DT configuration according to the embodiment. According to the embodiment, it is sufficient if one common DT 110 is prepared regardless of the number of services. As illustrated in FIG. 7B, in the case of the two service units #1 and #2 (411 and 412), the specific DT #1 (111) for the service unit #1 (411) and the specific DT #2 (112) for the service unit #2 (412) are prepared. Then, it is sufficient if the common DT 110 to be shared by the service units #1 and #2 (411 and 412) are prepared. It only needs to arrange one common DT 110 for all services. As a result, according to the embodiment, it becomes possible to enhance the effect of reducing the DT storage capacity as the number of services increases.

(Second Exemplary Process of Data Processing Device)

Figure 8A:
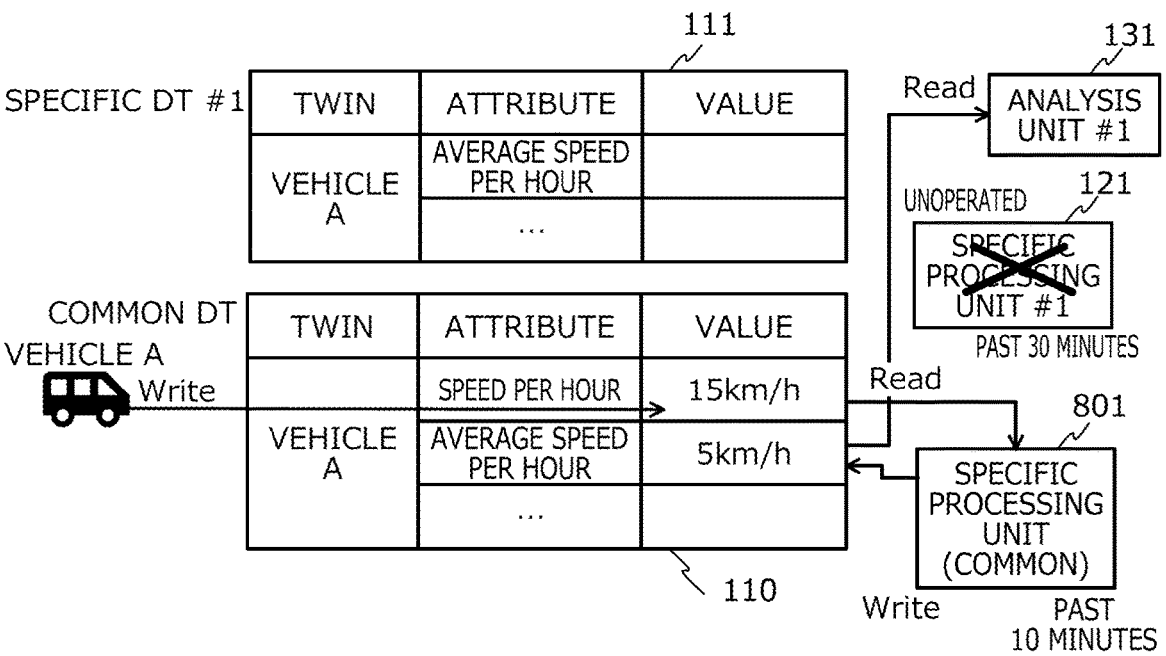
FIGS. 8A and 8B are explanatory diagrams of a second exemplary process performed by the data processing device.
Figure 8B:
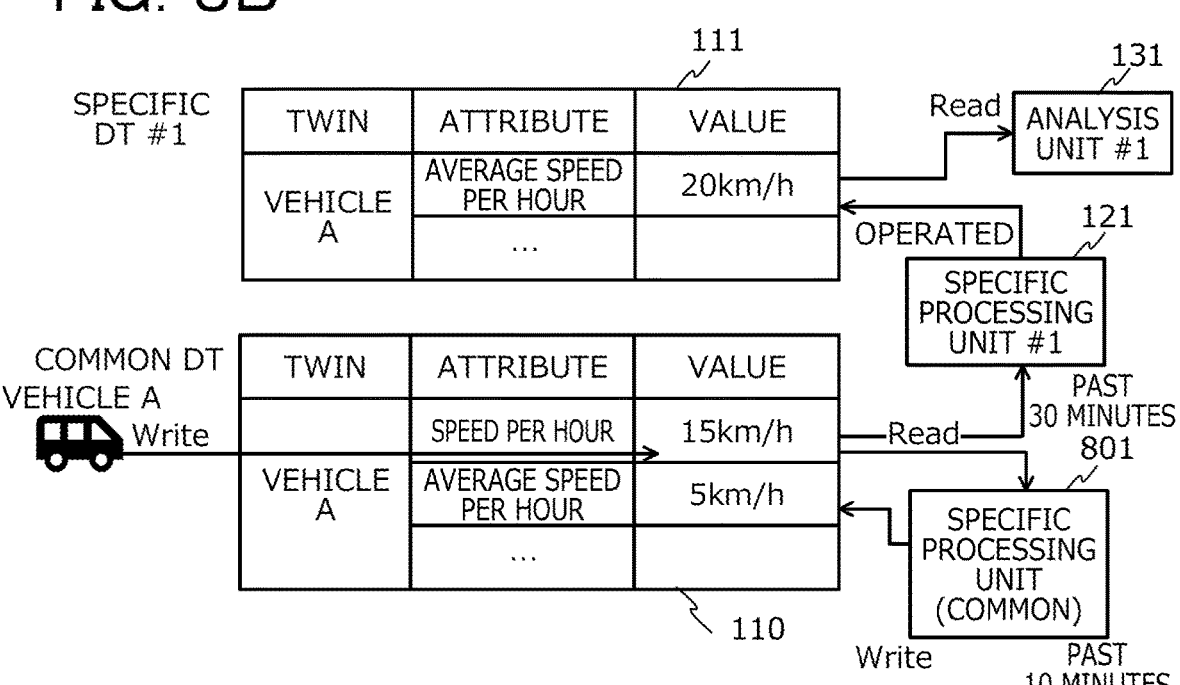

FIGS. 8A and 8B are explanatory diagrams of a second exemplary process performed by the data processing device. FIGS. 8A and 8B illustrate an exemplary process in the case of above-described [2.] reducing a change cost at a time of changing calculation of an attribute value depending on a situation. FIGS. 8A and 8B illustrate access states of reading and writing to the DT at different times.

The example illustrated in FIGS. 8A and 8B is an example of one service, and includes one common DT 110 and one specific DT #1 (111). An specific processing unit (common) 801 performs a process of reading the "speed per hour" of the vehicle A in the common DT 110, calculating the "average speed per hour" for the past 10 minutes, and writing it in the common DT 110.

It is assumed that the specific processing unit #1 (121) performs a process of reading the "speed per hour" of the vehicle A in the common DT 110, calculating the "average speed per hour" for the past 30 minutes, and writing it in the specific DT #1 (111) during operation.

Here, the distribution rule table 403 is a default distribution rule, which is "reading the attribute value of the common DT until the specific processing of the service is written, and reading the attribute of the specific DT when the specific processing is written".

In this second exemplary process, as illustrated in FIG. 8A, the analysis unit #1 (131) of a certain service reads the "average speed" from the common DT 110 when the specific processing unit #1 (121) is unoperated. Then, as illustrated in FIG. 8B, the analysis unit #1 (131) reads the "average speed" of the same attribute from the specific DT #1 (111) during the operation of the specific processing unit #1 (121).

In the example illustrated in FIGS. 8A and 8B, the specific processing unit #1 (111) is caused to operate when the situation changes due to a factor that a variation in the speed per hour of the vehicle A is large so that it is desired to increase the calculation of the "average speed per hour" from the past 10 minutes to the past 30 minutes. As a result, it becomes possible to reduce the change cost when the analysis unit #1 (131) changes the specific processing unit that calculates the attribute value from "common" to "#1" according to the situation change.

(Third Exemplary Process of Data Processing Device)

Figure 9A:
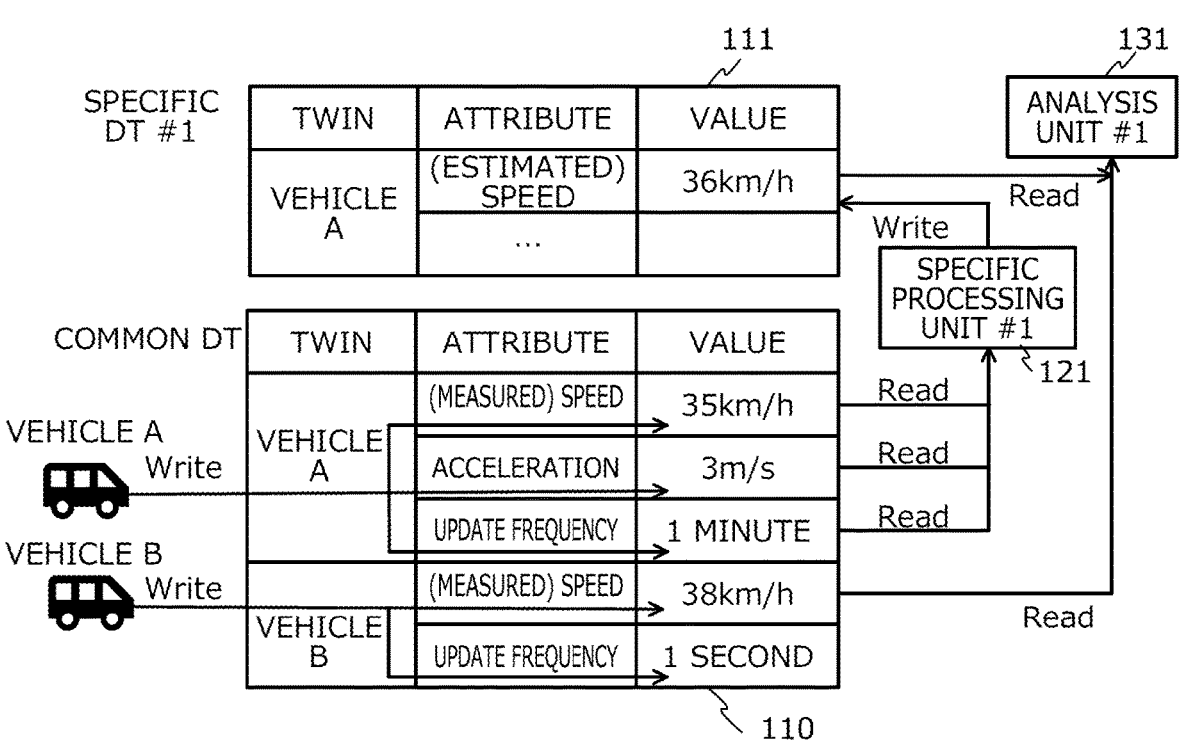
FIGS. 9A and 9B are explanatory diagrams of a third exemplary process performed by the data processing device.
Figure 9B:
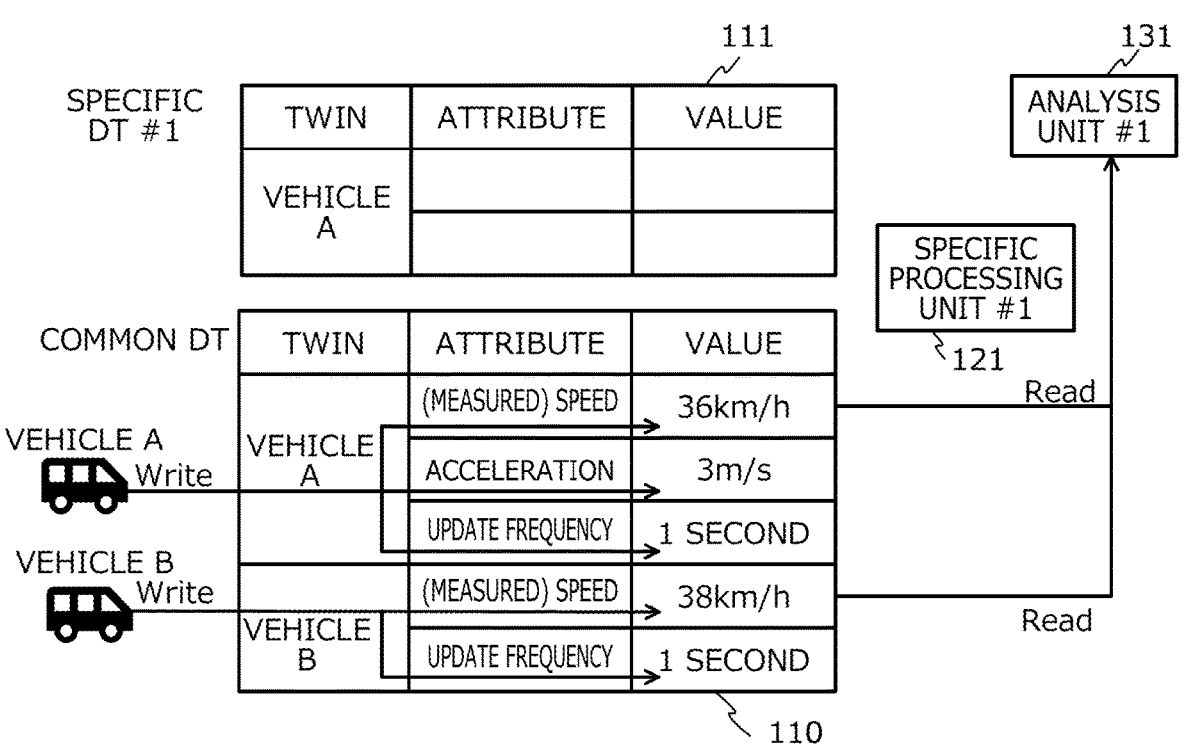

FIGS. 9A and 9B are explanatory diagrams of a third exemplary process performed by the data processing device. FIGS. 9A and 9B illustrates an exemplary process in the case of [3.] reducing a change cost when it is desired to change a reading destination of a DT depending on a situation described above. FIGS. 9A and 9B illustrate access states of reading and writing to the DT at different times.

The example illustrated in FIGS. 9A and 9B is an example of one service, and includes one common DT 110 and one specific DT #1 (111). The common DT 110 retains attributes "speed", "acceleration level", and "update frequency" and values of the respective attributes based on source data of a vehicle A. Furthermore, the common DT 110 retains attributes "speed" and "update frequency" and values of the respective attributes based on source data of a vehicle B.

As illustrated in FIG. 9A, the specific processing unit 121 performs a process of reading the values of the respective attributes of the vehicle A in the common DT 110, estimating a "speed", and writing it in the specific DT #1 (111). Then, in this third exemplary process, an specific processing unit for the vehicle B is not included, and a specific DT related to the vehicle B is also not included.

The analysis unit #1 (131) reads the value of the "(estimated) speed" from the specific DT #1 (111) for the vehicle A. Furthermore, the analysis unit #1 (131) reads the value of the "(measured) speed" directly from the common DT 110 for the vehicle B. Here, it is assumed that the update frequency of the source data "speed" of the vehicle A is 1 minute, whereas the update frequency of the source data "speed" of the vehicle B is 1 second, which is a state where the update frequency is higher than that of the vehicle A.

Here, the distribution rule table 403 is a default distribution rule, which is "reading the attribute value of the common DT until the specific processing of the service is written, and reading the attribute of the specific DT when the specific processing is written".

In this third exemplary process, as illustrated in FIG. 9A, the analysis unit #1 (131) of a certain service reads the "(estimated) speed" from the specific DT #1 (111) during the operation of the specific processing unit #1 (121). At this time, in the analysis unit #1 (131), low-accuracy analysis based on the "(estimated) speed" with the "update frequency" of 1 minute is carried out for the vehicle A, whereas high-accuracy analysis based on the "(measured) speed" with the "update frequency" of 1 second is carried out for the vehicle B. For example, the data processing device 100 is capable of determining whether the "update frequency" is high frequency or low frequency by comparing it with a threshold, and is also capable of determining whether data accuracy is high accuracy or low accuracy based on the "update frequency".

Here, as illustrated in FIG. 9B, it is assumed that the "update frequency" of the "speed" of the vehicle A is updated from 1 minute to 1 second. In this case, the analysis unit #1 (131) stops reading the "(estimated) speed" of the vehicle A from the specific processing unit #1 (121), and reads the "(measured) speed" from the common DT 110. In this case, the "update frequency" of the vehicle A is 1 second, and highly accurate analysis based on the "(measured) speed" may be carried out at the update frequency similar to that of the vehicle B.

In the example illustrated in FIGS. 9A and 9B, for example, the reading destination is changed to the DT with a value with higher accuracy due to a change in the update frequency (increase in accuracy) based on replacement of a sensor for detecting the speed of the vehicle A or the like. As a result, it becomes possible to reduce the change cost when the analysis unit #1 (131) changes the reading destination from "specific DT #1" to the "common DT"

(Exemplary Processing Procedure of Data Processing Device)

Next, an exemplary data processing procedure of the data processing device 100 will be described with reference to FIGS. 10 to 12.

Figure 10:
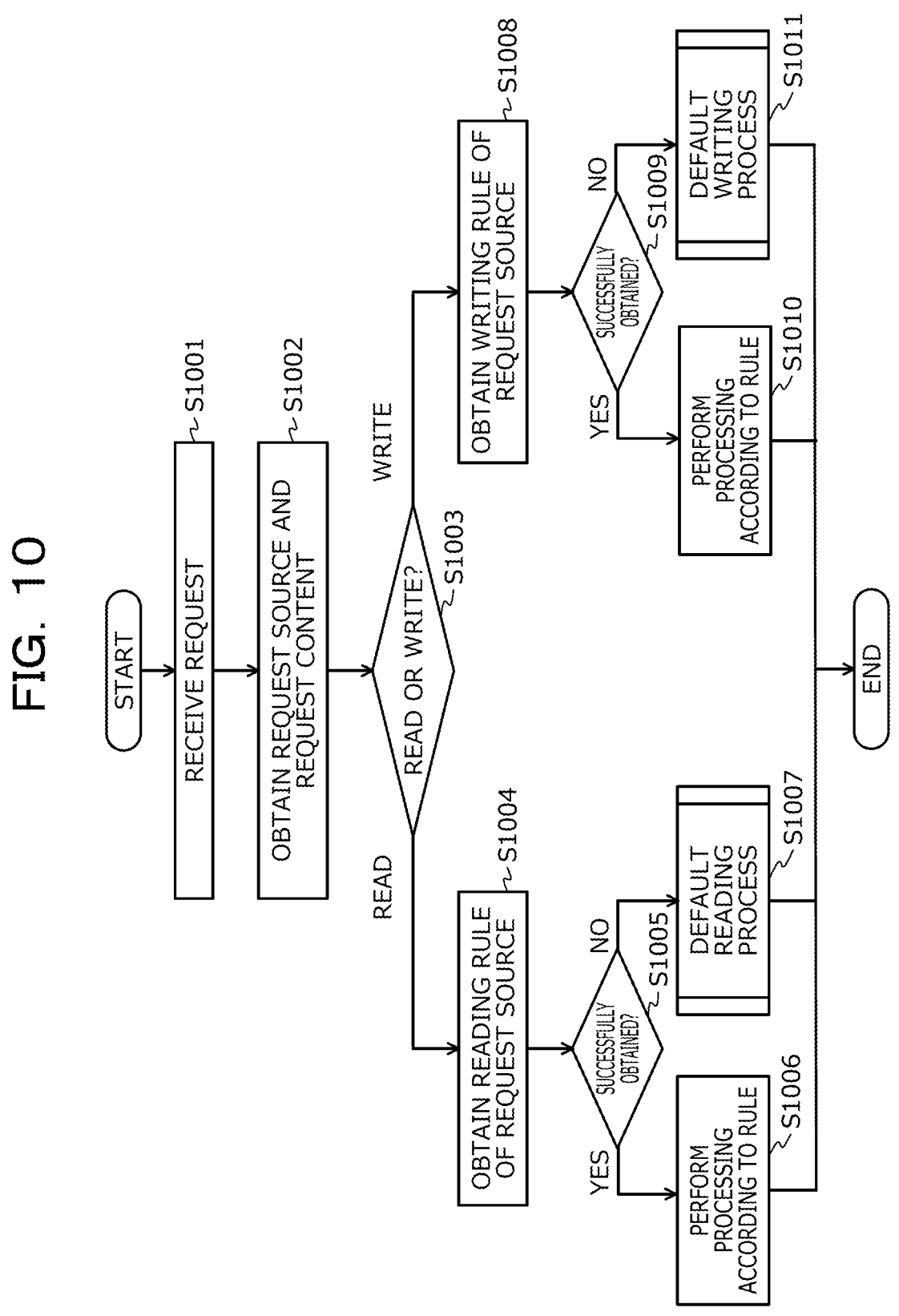
FIG. 10 is a flowchart illustrating an exemplary overall process of the data processing device.

FIG. 10 is a flowchart illustrating an exemplary overall process of the data processing device. The process of FIG. 10 is mainly performed by the integrated digital twin I/O unit 401 in FIG. 4, and is executed by the CPU 501 illustrated in FIG. 5.

First, the data processing device 100 receives a request for access to a DT (step S1001). Next, the data processing device 100 obtains a request source and request content (step S1002). The request source is, for example, the specific processing units #1 and #2 (121 and 122) or the analysis units #1 and #2 (131 and 132) of the service units #1 and #2 (411 and 412) described above.

Next, the data processing device 100 determines whether the request content is read or write (step S1003). If the request content is read (read in step S1003), the data processing device 100 proceeds to processing of step S1004. On the other hand, if the request content is write (write in step S1003), the data processing device 100 proceeds to processing of step S1008.

In step S1004, the data processing device 100 obtains a reading rule of the request source (step S1004). Then, the data processing device 100 determines whether or not the reading rule of the request source has been successfully obtained (step S1005). If the reading rule of the request source has been successfully obtained (Yes in step S1005), the data processing device 100 processes the data read in accordance with the obtained rule (distribution rule) (step S1006), and terminates the process above.

On the other hand, if it fails to obtain the reading rule of the request source (No in step S1005), the data processing device 100 performs a default reading process (step S1007), and terminates the process above. In the default reading process, the data processing device 100 performs data read processing in accordance with the default distribution rule, and terminates the process above.

In step S1008, the data processing device 100 obtains a writing rule of the request source (step S1008). Then, the data processing device 100 determines whether or not the writing rule of the request source has been successfully obtained (step S1009). If the writing rule of the request source has been successfully obtained (Yes in step S1009), the data processing device 100 performs data write processing in accordance with the obtained rule (distribution rule) (step S1010), and terminates the process above.

On the other hand, if it fails to obtain the writing rule of the request source (No in step S1009), the data processing device 100 performs a default writing process (step S1011), and terminates the process above. In the default writing process, the data processing device 100 performs data write processing in accordance with the default distribution rule, and terminates the process above.

Figure 11:
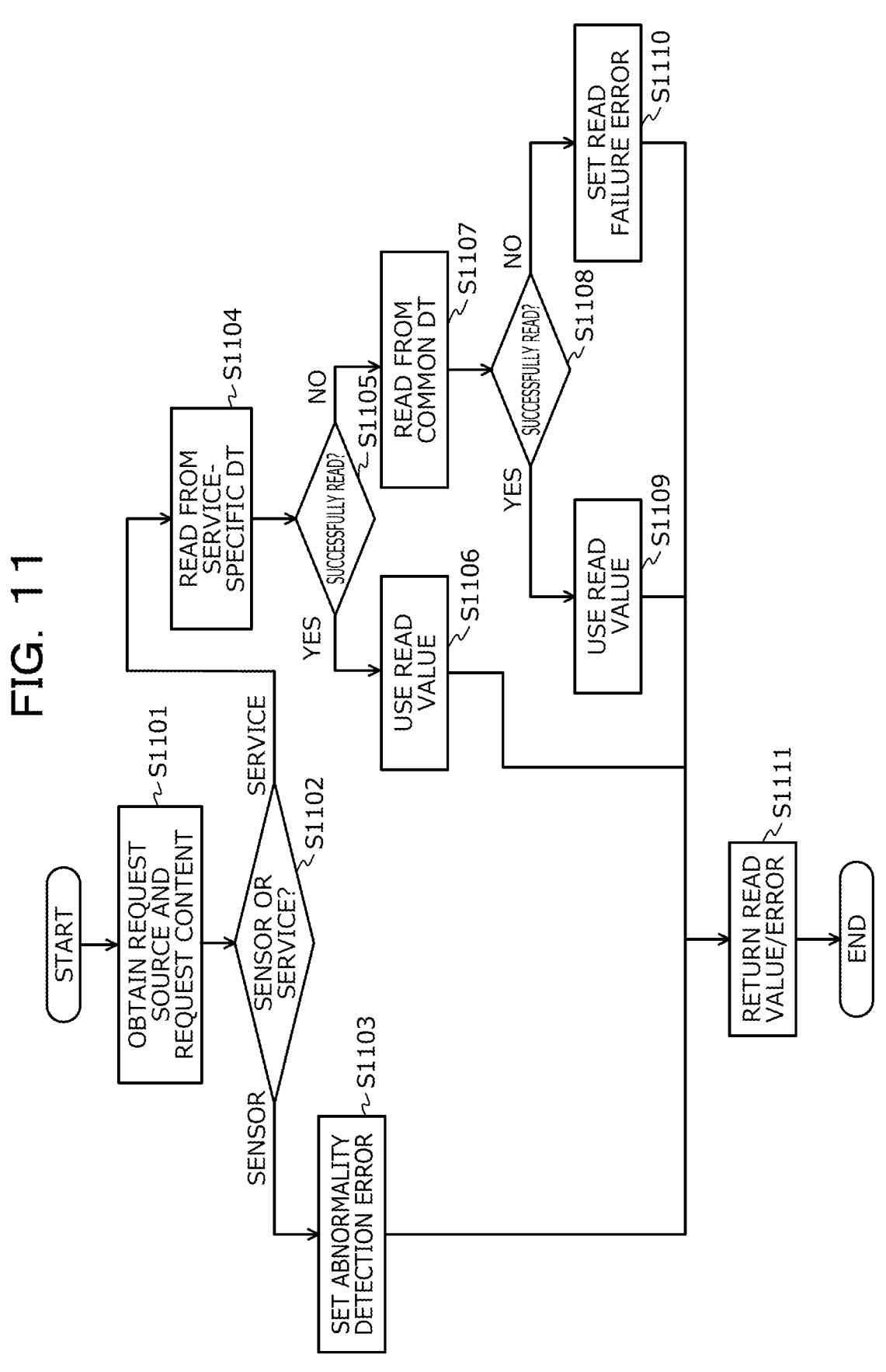
FIG. 11 is a flowchart illustrating an exemplary default reading process of the data processing device.

FIG. 11 is a flowchart illustrating an exemplary default reading process of the data processing device. The process illustrated in FIG. 11 is a detailed process of the default reading process indicated in step S1007 in FIG. 10.

First, the data processing device 100 obtains a request source and request content of reading with respect to a DT (step S1101). Here, it is assumed that the request source is the sensor that transmits the speed of the vehicle A described above, the specific processing units #1 and #2 (121 and 122) of the service units #1 and #2 (411 and 412), or the analysis units #1 and #2 (131 and 132).

Then, the data processing device 100 determines whether the request source is a sensor or a service (step S1102). As a result of the determination, if the request source is a sensor (sensor in step S1102), the data processing device 100 sets an abnormality detection error (step S1103), and proceeds to processing of step S1111. Here, since the sensor makes only a write request by transmission, reading is regarded as an abnormality detection error.

On the other hand, if the request source is a service as a result of the determination in step S1102 (service in step S1102), the data processing device 100 reads data from the service-specific DT corresponding to the service (step S1104). Next, the data processing device 100 determines whether or not the data has been successfully read (step S1105).

If the data has been successfully read as a result of the determination in step S1105 (Yes in step S1105), the data processing device 100 uses the read value (step S1106), and proceeds to the processing of step S1111.

On the other hand, if it fails to read the data (No in step S1105), the data processing device 100 reads data from the common DT in accordance with the default distribution rule (step S1107). Next, the data processing device 100 determines whether or not the data has been successfully read (step S1108).

If the data has been successfully read as a result of the determination in step S1108 (Yes in step S1108), the data processing device 100 uses the read value (step S1109), and proceeds to the processing of step S1111.

On the other hand, if it fails to read the data (No in step S1108), the data processing device 100 sets a read failure error (step S1110), and proceeds to the processing of step S1111.

In step S1111, the data processing device 100 returns the read value or the error to the request source (step S1111), and terminates the process above. The service unit (specific processing unit or analysis unit) as the request source performs data processing based on the value returned by the data processing device 100, and performs error processing when an error occurs.

Figure 12:
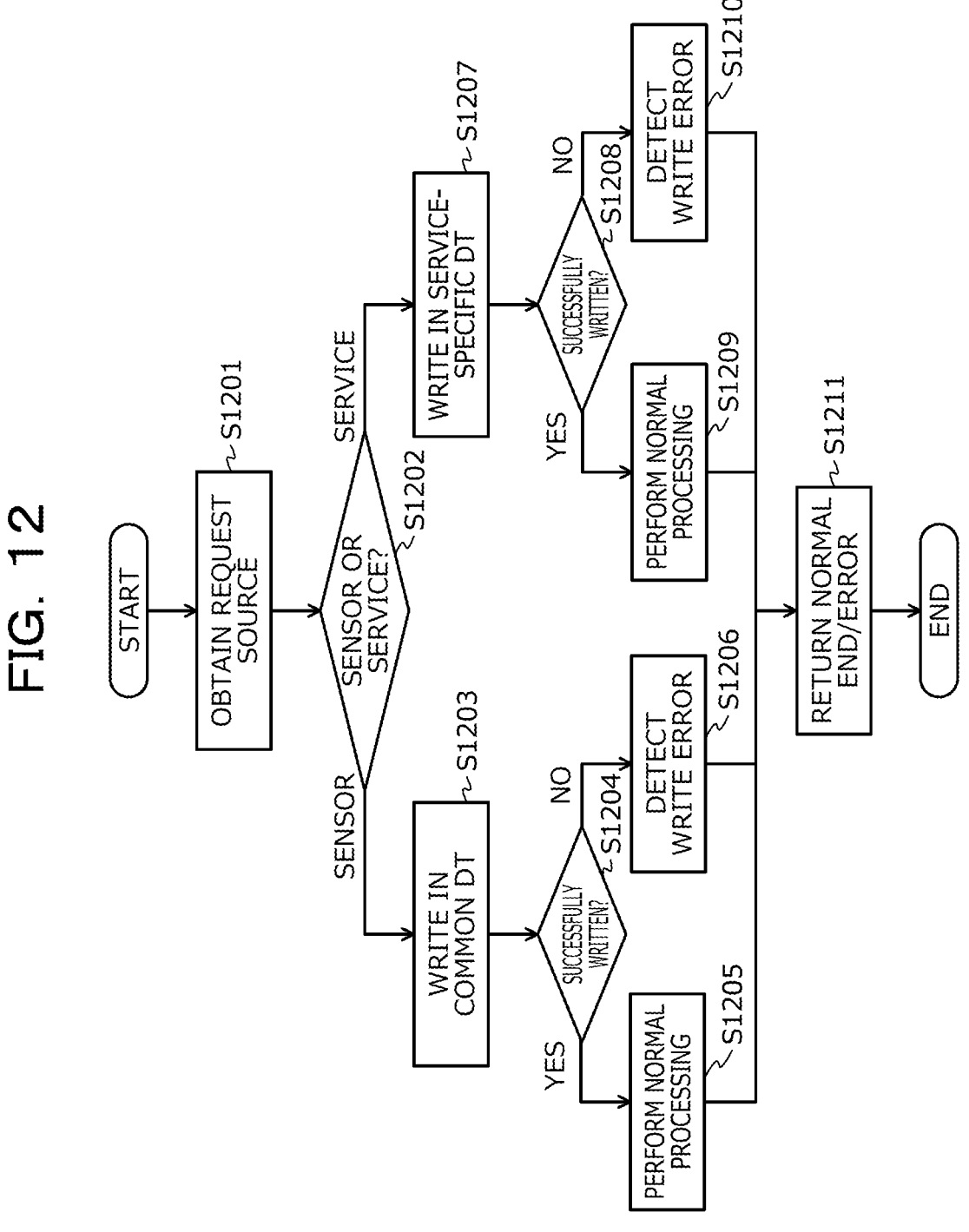
FIG. 12 is a flowchart illustrating an exemplary default writing process of the data processing device.

FIG. 12 is a flowchart illustrating an exemplary default writing process of the data processing device. The process illustrated in FIG. 12 is a detailed process of the default writing process indicated in step S1011 in FIG. 10.

First, the data processing device 100 obtains a request source of writing to a DT (step S1201). Here, it is assumed that the request source is the sensor that transmits the speed of the vehicle A described above, the specific processing units #1 and #2 (121 and 122) of the service units #1 and #2 (411 and 412), or the analysis units #1 and #2 (131 and 132).

Then, the data processing device 100 determines whether the request source is a sensor or a service (step S1202). As a result of the determination, if the request source is a sensor (sensor in step S1202), the data processing device 100 writes data in the common DT (step S1203), and proceeds to processing of step S1204.

On the other hand, if the request source is a service as a result of the determination in step S1202 (service in step S1202), the data processing device 100 writes the data in the service-specific DT corresponding to the service (step S1207), and proceeds to processing of step S1208.

After the processing of step S1203, the data processing device 100 determines whether or not the data has been successfully written (step S1204). As a result of the determination, if the data has been successfully written in the common DT (Yes in step S1204), the data processing device 100 determines that the writing is normal processing (step S1205), and proceeds to processing of step S1211.

On the other hand, if the it fails to write the data in the common DT as a result of the determination (No in step S1204), the data processing device 100 detects a write error (step S1206), and proceeds to the processing of step S1211.

Furthermore, after the processing of step S1207, the data processing device 100 determines whether or not the data has been successfully written (step S1208). As a result of the determination, if the data has been successfully written in the service-specific DT (Yes in step S1208), the data processing device 100 determines that the writing is normal processing (step S1209), and proceeds to the processing of step S1211.

On the other hand, if the it fails to write the data in the service-specific DT as a result of the determination (No in step S1208), the data processing device 100 detects a write error (step S1210), and proceeds to the processing of step S1211.

In step S1211, the data processing device 100 returns the normal end of the writing or the error to the request source (step S1211), and terminates the process above. The service unit (specific processing unit or analysis unit) as the request source performs data processing based on the value returned by the data processing device 100, and performs error processing when an error occurs.

In the descriptions of the data processing device 100 described above, the request source that accesses the DT may be set not only for each service but also in units of the specific processing unit or the analysis unit. Furthermore, as illustrated in the record 403-4 of the distribution rule table 403 in FIG. 4, the specific processing (e.g., equivalent to the second exemplary process) may be set to read and write data in the common DT as a distribution rule unique to the request source. Then, if the unique distribution rule has been successfully obtained from the request source, the distribution rule may be easily added only by adding the record 403-4 to the distribution rule table 403 in FIG. 4.

The data processing device 100 according to the embodiment described above includes a common digital twin in which first processed data obtained by processing received source data is stored, a specific digital twin in which second processed data obtained by processing the source data is stored, and a plurality of service-specific service units that requests access to the common digital twin or the specific digital twin to perform data processing. The plurality of service units reads the second processed data from the specific digital twin for each of a plurality of services in accordance with a predetermined data distribution rule, and reads the first processed data from the common digital twin when it is determined that there is no data to be read. As a result, one integrated digital twin is formed in which data used by the plurality of services in common is stored in the common digital twin and data unique to each of the plurality of services is stored in the specific digital twin. Furthermore, according to the data distribution rule of the specific digital twin→common digital twin, the service unit is enabled to efficiently read needed data. As a result, it becomes possible to suppress an increase in the storage area for efficient use even when the number of services increases.

Furthermore, in a case where the request source of the access to the digital twin has an specific distribution rule, the data processing device 100 obtains the specific distribution rule. Then, it accesses the common digital twin or the specific digital twin in accordance with the obtained specific distribution rule. This makes it possible to access the common digital twin or the specific digital twin in accordance with the distribution rule of the request source.

Furthermore, the plurality of service units of the data processing device 100 may include an specific processing unit that generates the second processed data obtained by processing the source data and writes the second processed data in the specific digital twin, and an analysis unit that processes the first processed data or the second processed data. The analysis unit reads the second processed data from the specific digital twin for each of the plurality of services, and reads the first processed data from the common digital twin when it is determined that there is no data to be read. As described above, the service unit may include the service-specific specific processing unit and the analysis unit that carries out analysis after the specific processing. In this case, the analysis unit may carry out not only the analysis based on the second processed data after the specific processing but also the analysis based on the first processed data.

Furthermore, the plurality of service units of the data processing device 100 may perform a process of reading the first processed data from the common digital twin and writing the second processed data obtained by processing the read first processed data in the specific digital twin for each service. As a result, the first processed data may be shared and used by the plurality of service units, and the second processed data specifically processed by each of the service units may be stored in the specific digital twin different for each service.

Furthermore, the service unit of the data processing device 100 may make access of reading and writing to data of the same attribute in the common digital twin and the specific digital twin. As a result, for example, in a case where data of a certain attribute may not be read from the common digital twin, the service such as analysis may be continued by reading data of the same attribute from the specific digital twin.

Furthermore, it is assumed that the specific processing unit of the data processing device 100 may switch between execution and non-execution of the process of reading the first processed data from the common digital twin and creating processed second processed data. In this case, the analysis unit reads the first processed data from the common digital twin at the time of non-execution of the specific processing unit. On the other hand, at the time of execution of the specific processing unit, the analysis unit may switch to the processing of reading the second processed data from the specific digital twin. As a result, for example, it becomes possible to cope with a change in situation such as changing the calculation state of the attribute value depending on execution or non-execution of the specific processing unit, and to suppress the change cost of the process related to the situation change.

Furthermore, the analysis unit of the data processing device 100 reads the second processed data from the specific digital twin when the data accuracy of the source data is low accuracy or a low update frequency based on the data accuracy or the update frequency of the source data. On the other hand, when the data accuracy of the source data is high accuracy or a high update frequency, the first processed data may be read from the common digital twin. As a result, it becomes possible to cope with the data accuracy or the update frequency of the source data, and for example, it becomes possible to read data with higher accuracy or a higher update frequency among the data retained in the common digital twin and the specific digital twin to use it for analysis.

Furthermore, the data processing device 100 writes the first processed data obtained by processing the received source data in the common digital twin in accordance with a predetermined data distribution rule. Furthermore, the plurality of service units may write the second processed data obtained by processing the source data in the specific digital twin for each service. As a result, a large number of pieces of source data may be received at all times and stored and retained in the common digital twin as the first processed data, and the second processed data for each service unit may be stored in the specific digital twin for each service.

From the above, in the digital twin accessed by a large number of services, the data processing device 100 according to the embodiment is enabled to provide data available for each service in common in the common digital twin and to provide data unique to each service in the specific digital twin. The specific digital twin is separated for each service and may be applied to services different from each other, and data may not be read from each other between different services so that confidentiality may be maintained. The integrated digital twin in which the common digital twin and the specific digital twin are integrated may be applied to Mobility as a Service (MaaS), a smart city such as pedestrian traffic flow guidance, and the like.

Note that the data processing method described in the embodiment may be implemented by causing a processor such as a server to execute a program prepared in advance. The present method is implemented by being recorded in a computer-readable recording medium such as a hard disk, a flexible disk, a compact disc read only memory (CD-ROM), a digital versatile disk (DVD), a flash memory, or the like, and being read from the recording medium by a computer. Furthermore, the present method may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method implemented by a data processing device that includes:

one or more storage devices storing a common digital twin configured to store first processed data obtained by processing source data received from one or more sensor devices, and a plurality of specific digital twins, each specific digital twin being associated with a corresponding service of a plurality of services and being configured to store second processed data obtained by processing the first processed data based on a processing rule corresponding to the corresponding service, the first processed data being data to be processed in common to the plurality of services, the second processed data being data to be processed specifically to the corresponding service of the plurality of services; and a processor circuitry coupled to the one or more storage devices, the method comprising:

the processor circuitry receiving a request from any of devices including the one or more sensor devices and a plurality of service processors, each service processor corresponding to a respective one of the plurality of services; and the processor circuitry accessing, in response to the received request, either the common digital twin or at least any one of the plurality of specific digital twins, in accordance with a predetermined data distribution rule, the accessing including:

(1) the processor circuitry writing, in response to the request being a write request including a first source data from any one of the one or more sensor devices, a first processed data item obtained from the first source data to the common digital twin;

(2) in response to the request being a read request from a specific service processor among the plurality of service processors, (2-1) the processor circuitry accessing, among the plurality of specific digital twins, a specific digital twin corresponding to the specific service processor to retrieve the second processed data from the specific digital twin and provide the retrieved second processed data to the specific service processor, and (2-2) in a case where no specific second processed data to be read by the read request is determined to exist in the specific digital twin, the processor circuitry retrieving the first processed data from the common digital twin to provide the retrieved first processed data to the specific service processor; and (3) the processor circuitry writing, in response to the request being a write request including the second processed data from the specific service processor, the second processed data included in the write request from the specific service processor to the specific digital twin corresponding to the specific service processor.

2. The method according to claim 1, wherein when a request source of the received request has a specific distribution rule, the processor circuitry obtaining the specific distribution rule associated with the request source of the received request, and the processor circuitry accesses, in response to the received request, the common digital twin or the specific digital twin in accordance with the obtained specific distribution rule.

3. The method according to claim 1, wherein the each service processor of the plurality of service processors is configured to perform processing including:

(1) transmitting the read request to the processor circuitry to process;

(2) in a case where the first processed data is received in response to the transmitting of the read request, (2-1) generating the second processed data obtained by processing the first processed data, and one or more pieces of the and (2-2) transmitting the write request including the generated second processed data to the processor circuitry; and (3) in a case where the second processed data is received in response to the transmitting of the read request, processing the second processed data received from the processor circuitry.

4. The method according to claim 1, wherein the each service processor makes access of reading and writing to data of a same attribute in the common digital twin and the specific digital twin.

5. The method according to claim 3, wherein in a case where the specific processing processor switches between execution and non-execution of a process in which the first processed data is read from the common digital twin and the second processed data that has been processed is generated, the analysis circuit is configured to:

read the first processed data from the common digital twin at a time of the non-execution of the specific processing circuit; and read the second processed data from the specific digital twin at a time of the execution of the specific processing circuit.

6. The method according to claim 3, wherein the analysis circuit is configured to:

read, based on data accuracy or an update frequency of the source data, the second processed data from the specific digital twin when the data accuracy of the source data is low accuracy or the update frequency of the source data is a low update frequency; and read the first processed data from the common digital twin when the data accuracy of the source data is high accuracy or the update frequency of the source data is a high update frequency.

7. The method according to claim 1, wherein in accordance with the predetermined data distribution rule, the first processed data obtained by processing the received source data is written in the common digital twin, and the each of the plurality of service processors writes the second processed data obtained by processing the source data in the specific digital twin for each of the plurality of services.

8. A non-transitory computer-readable recording medium storing a data processing program to be executed by a computer that includes:

one or more storage devices that store a common digital twin configured to store first processed data obtained by processing source data received from one or more sensor devices, and a plurality of specific digital twins, each specific digital twin being associated with a corresponding service of a plurality of services and being configured to store second processed data obtained by processing one or more pieces of the source data based on a processing rule corresponding to the corresponding service, the first processed data being data to be processed in common to the plurality of services, the second processed data being data to be processed specifically to the corresponding service of the plurality of services; and a processor circuitry coupled to the one or more storage devices, the data processing program being a program causing the processor circuitry of the computer to execute processing comprising:

receiving a request from any of devices including the one or more sensor devices and a plurality of service processors, each service processor corresponding to a respective one of the plurality of services; and accessing, in response to the received request, either the common digital twin or at least any one of the plurality of specific digital twins, in accordance with a predetermined data distribution rule, the accessing including:

(1) writing, in response to the request being a write request including a first source data from any one of the one or more sensor devices, a first processed data item obtained from the first source data to the common digital twin;

(2) in response to the request being a read request from a specific service processor among the plurality of service processors, (2-1) accessing, among the plurality of specific digital twins, a specific digital twin corresponding to the specific service processor to retrieve, the second processed data from the specific digital twin and provide the retrieved second processed data to the specific service processor, and (2-2) in a case where no specific second processed data to be read by the read request is determined to exist in the specific digital twin, retrieving the first processed data from the common digital twin to provide the retrieved first processed data to the specific service processor; and (3) writing, in response to the request being a write request including the second processed data from the specific service processor, the second processed data included in the write request from the specific service processor to the specific digital twin corresponding to the specific service processor.

9. A data processing apparatus comprising:

one or more storage devices that store a common digital twin configured to store first processed data obtained by processing source data received from one or more sensor devices, and a plurality of specific digital twins, each specific digital twin being associated with a corresponding service of a plurality of services and being configured to store second processed data obtained by processing one or more pieces of the source data based on a processing rule corresponding to the corresponding service, the first processed data being data to be processed in common to the plurality of services, the second processed data being data to be processed specifically to the corresponding service of the plurality of services; and a processor circuitry coupled to the one or more storage devices, the processor being configured to perform processing comprising:

receiving a request from any of devices including the one or more sensor devices and a plurality of service processors, each service processor corresponding to a respective one of the plurality of services; and accessing, in response to the received request, either the common digital twin or at least any one of the plurality of specific digital twins, in accordance with a predetermined data distribution rule, the accessing including:

(1) writing, in response to the request being a write request including a first source data from any one of the one or more sensor devices, a first processed data item obtained from the first source data to the common digital twin;

(2) in response to the request being a read request from a specific service processor among the plurality of service processors, (2-1) accessing, among the plurality of specific digital twins, a specific digital twin corresponding to the specific service processor to retrieve the second processed data from the specific digital twin and provide the retrieved second processed data to the specific service processor, and (2-2) in a case where no specific second processed data to be read by the read request is determined to exist in the specific digital twin, retrieving the first processed data from the common digital twin to provide the retrieved first processed data to the specific service processor; and (3) writing, in response to the request being a write request including the second processed data from the specific service processor, the second processed data included in the write request from the specific service processor to the specific digital twin corresponding to the specific service processor.

* * * * *